United States Patent [19]

Beard

[11] 4,383,922
[45] May 17, 1983

[54] WASTE WATER CLARIFIER

[76] Inventor: Harold J. Beard, P.O. Box 3838, Baton Rouge, La. 70896

[21] Appl. No.: 370,802

[22] Filed: Apr. 22, 1982

Related U.S. Application Data

[63] Continuation-in-part of Ser. No. 316,112, Oct. 29, 1981, Pat. No. 4,362,625.

[51] Int. Cl.³ .............................................. B01D 21/00
[52] U.S. Cl. .................................. 210/521; 210/170; 210/532.1
[58] Field of Search .................. 210/170, 242.1, 242.3, 210/521, 532.1, 923

[56] References Cited

U.S. PATENT DOCUMENTS

| Re. 22,652 | 6/1945 | Roybold et al. ..................... 210/151 |
| 1,774,793 | 9/1930 | Egan ...................................... 210/237 |
| 2,233,218 | 2/1941 | Moore .............................. 210/170 X |
| 2,374,772 | 5/1945 | Nordell ................................ 210/255 |
| 3,517,812 | 6/1970 | Bucchioni et al. ................... 210/806 |
| 3,701,429 | 10/1972 | Schell ................................... 210/242 |
| 3,744,257 | 7/1973 | Spanner ............................... 210/242 |
| 3,817,383 | 6/1974 | Michel et al. ......................... 210/170 |
| 4,038,185 | 7/1977 | Kline .................................... 210/519 |
| 4,087,361 | 5/1978 | Block et al. .......................... 210/199 |
| 4,116,835 | 9/1978 | Bertelson ............................. 210/255 |
| 4,119,541 | 10/1978 | Makaya ............................. 210/242.1 |
| 4,219,424 | 9/1980 | Tamura et al. ....................... 210/201 |
| 4,257,889 | 3/1981 | Wober et al. ..................... 210/923 X |
| 4,265,757 | 5/1981 | Ivanoff ............................ 210/923 X |
| 4,303,516 | 12/1981 | Stensel et al. ..................... 210/195.4 |

FOREIGN PATENT DOCUMENTS

| 514517 | 6/1954 | Belgium ............................... 210/170 |
| 996122 | 12/1951 | France ................................ 210/170 |
| 373800 | 8/1939 | Italy .................................... 210/170 |

Primary Examiner—Robert H. Spitzer
Attorney, Agent, or Firm—Roy Kiesel

[57] ABSTRACT

A process and apparatus for treatment of waste water is provided wherein a waste water clarifier is positioned in a waste water flow channel and having a body assembly with a bow section facing into and extending above the waste water currents, a stern section having a opening below the waste water level to allow waste water to enter the clarifier and, having a rear baffle extending between clarifier side walls and extending downward perpendicularly thereto and a second baffle extending partially between the clarifier side walls and extending downward and perpendicularly thereto, the bottom section having rows of tubular pipes extending at an angle downward therefrom with the pipe openings facing opposite the waste water flow, and an effluent launder fixedly positioned in the bow section.

7 Claims, 3 Drawing Figures

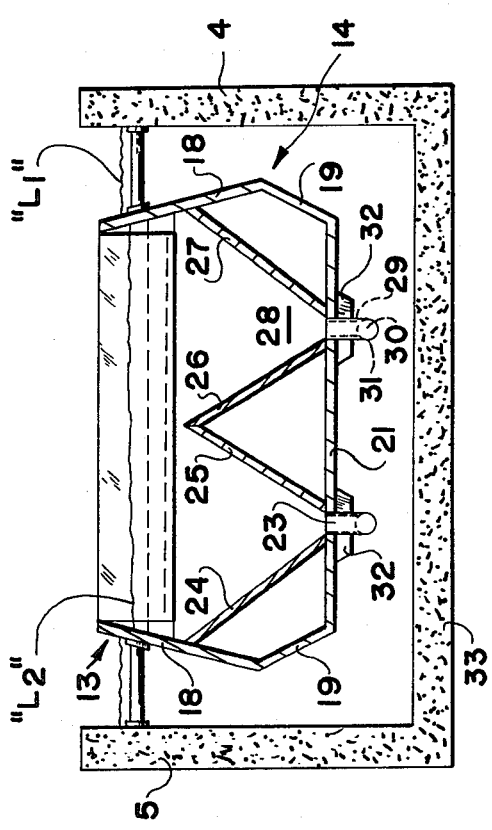
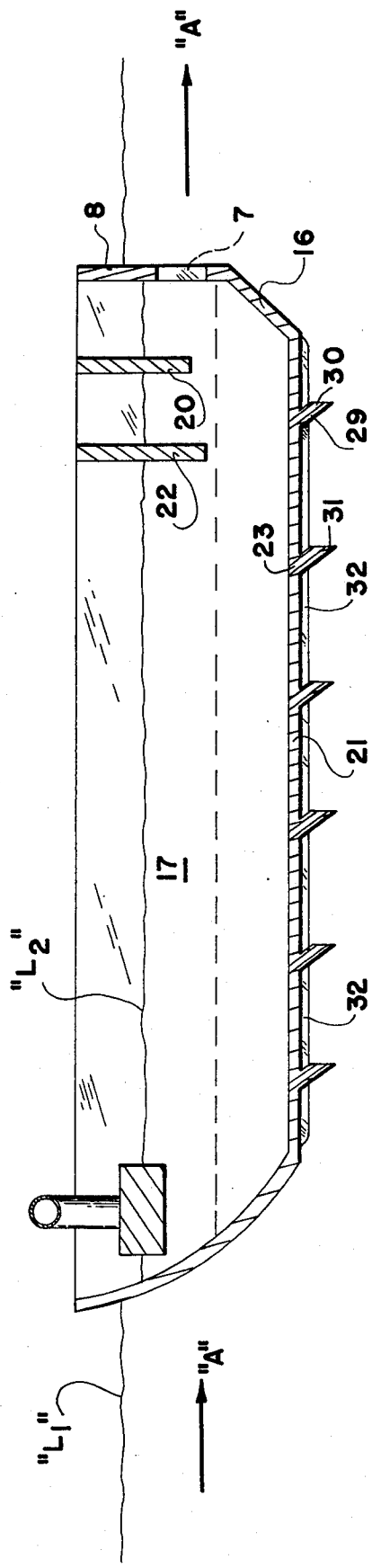

WASTE WATER CLARIFIER

RELATED APPLICATIONS

This is a continuation-in-part application of U.S. Pat. application Ser. No. 316,112 filed Oct. 29, 1981, now U.S. Pat. No. 4,362,625 by the inventer herein and entitled "Waste Water Clarifier", specific mention being made to obtain benefit of the parent applications filing date.

BACKGROUND OF THE INVENTION

1. Field of the Invention

This invention relates in general to waste water treatment, and more particularly to a clarifier placed in a waste water flow channel.

2. Prior Art

In conventional waste water treatment processes a portion or all of the waste water is diverted to a settling pond or a flow channel. There the solids contained in the waste water are separated out by settling or chemical treatment. The purified water is then returned to the main waste water stream for final disposition.

In an effort to overcome these prior art problems, applicant's aforementioned patent application discloses an apparatus and process which overcomes these prior art difficulties. However, it is very desirable to further increase the rate of clarifying the waste water.

SUMMARY OF THE INVENTION

Therefore, it is an object of this invention to provide a waste water clarifier which can more rapidly remove solids from a waste water stream.

Another object of this invention is to provide a waste water clarifier which results in a reduced sized settling stream for a given quantity of waste water to be treated.

Still another object of this invention is to provide a waste water clarifier that does not require the addition of chemicals to remove solids from waste water.

A further object of this invention is to provide a waste water clarifier which requires no scraping mechanisms.

These and other objects and advantages of this invention will become apparent from the ensuing descriptions of the invention.

Accordingly, a clarifier for removing suspended solids from moving waste water located in a waste water flow channel is provided comprising a boat shaped structure having its bow directed into the direction of the waste water flow and having its stern section below the channel waste water level to allow the waste water to enter the clarifier and having a baffle extending between clarifier side walls and extending downward perpendicularly thereto and a second baffle extending partially between the clarifier side walls and extending downward and perpendicular thereto, a bottom section having tubular pipes extending at an angle downward therefrom with the pipe opening facing opposite the waste water flow, and an effluent launder having a trough positioned in the bow section and having means to allow the clarified waste water to enter the trough.

BRIEF DESCRIPTION OF THE DRAWINGS

FIG. 2 is a cross-sectional view taken along lines II—II of FIG. 1.

FIG. 3 is a cross-sectional view taken along lines III—III of FIG. 1.

PREFERRED EMBODIMENTS OF THE INVENTION

Figure 1:
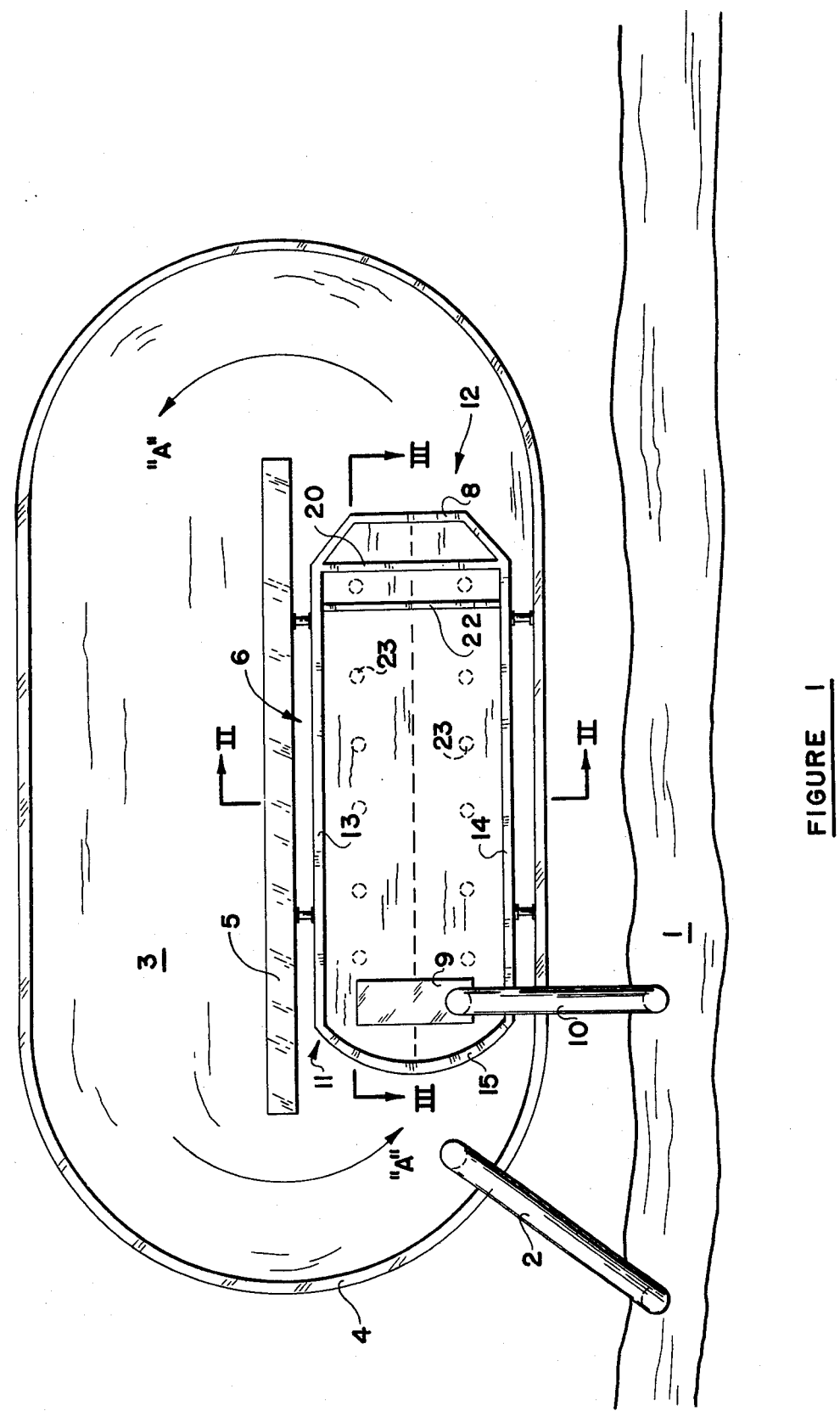
FIG. 1 is a top view of a waste water flow channel with a preferred embodiment of the clarifier positioned therein.

In a waste water treatment process according to this invention as seen in FIGS. 1-3, waste water is injected by conduit 2 which is provided with conventional screens for removal of large solid materials such as branches, etc. into waste water channel 3 formed by concrete walls 4 and 5. Within channel 3 the waste water is directed to flow in the directions indicated by the arrows "A". As the water flows past the clarifier, denoted generally by the numeral 6, a portion flows back into clarifier 6 through opening 7 of rear wall 8, where the waste water is separated into a solids stream and clarified water stream. The clarified water stream is directed into effluent launder 9 where it is either pumped or flows by gravity through conduit 10 to stream 1.

Clarifier 6 is illustrated comprising, in general, a bow or forward section 11, a stern or rear section 12, side walls 13 and 14 and keel or bottom panel 21 attached to one another in a boat-like shape as shown. In a preferred embodiment side walls 13 and 14 are positioned a distance away from concrete walls 4 and 5 to allow any matter flowing in channel 3 to float by walls 13 and 14 to avoid in daming problems.

Forward section 9 is constructed from a arcuately-shaped bow wall 15 sloped inward from the top. Rear section 12 comprises panel 16 having opening 7 positioned below the channel waste water level "$L_1$" to allow the waste water from channel 3 to flow into clarifier middle chamber 17 where it will eventually rise to level "$L_2$" as shown.

The forward section 11 and rear section 12 are attached by side walls 13 and 14 which in a preferred embodiment are each constructed from a top flat panel 18 and bottom flat panel 19 angled outward along their line of attachment. In this manner less turbulence is created in the waste water as it flows past clarifier 6.

In a preferred embodiment, a rear baffle 20 is attached between side walls 13 and 14 and extends downward toward the clarifier bottom 21. It is also preferred that a second baffle 22 be positioned between rear baffle 20 and launder 9 to help reduce turbulence in clarifier 6. Second baffle 22 preferably extends only partially between side walls 13 and 14 and like rear baffle 20 extends downward toward bottom 21. Clarifier bottom 21 is provided with a parallel rows of openings 23 extending the length of clarifier 6. Sloped rectangular panels 24, 25 26, and 27 are attached to side walls 13 and 14 and bottom 21 to form troughs 28 that direct the settling waste toward openings 23.

In order to further reduce turbulence in chamber 17 resulting in bubbling of air from the waste water in channel 3 through openings 23 it is preferred that directional tubes or pipe stems 29 extend downward from bottom openings 23 at an angle so that pipe openings 30 face away from the flow of the waste water stream. In a more preferred embodiment pipe opening face 31 is perpendicular to clarifier bottom 21.

In another preferred embodiment keels 32 are positioned on either side of pipe stems 29 to not only support pipe stems but to guide the waste water stream around pipes 29.

In operation clarifier 6 is placed in channel 3 so that forward section 11 faces into the waste water current. Because clarifier 6 restricts the waste water flow, the velocity of the waste water is increased as it passes clarifier 6. In this regard, it is preferred that clarifier 6 is positioned near channel bottom 33 to increase the waste water velocity past clarifier 6. It is also preferred that clarifier 6 be anchored in position by any conventional means. This increased velocity results in waste water entering clarifier chamber 17 through opening 7. The waste water entering rear panel section 12 flows toward forward section 11. Since this flow is at substantially reduced velocity, solids suspended in the waste water settle toward opening 23 and are removed through pipe openings 30. This results in a clarified waste water strata at the upper portion of clarifier chamber 17. This clarified strata is allowed to enter effluent launder 9 where it is removed by conduit 10 and discharged to the main stream 1. It has been found that by using the clarifier configuration claimed turbulence of the waste water flowing past clarifier 6 and turbulence of the waste water in clarifier chamber 17 has been minimized resulting in more rapid and efficient removal of solids from the waste water.

Present day clarifier and settling ponds are designed to achieve a clarified water discharge stream containing less than 20 ppm of suspended solids. To achieve this discharge rate, the clarifer 6 is placed in channel 3 and an equilibrium state is reached. At this point the forward openings 23 near launder 9 can be plugged or restricted and the clear water removal rate can be increased. This method allows slower movement in the clarifier and therefore a greater clear water zone. This balancing by further restricting the openings in those sections on which the sludge blanket has been removed, allows for greater removal from the launder and therefore increased capacity.

There are, of course, many alternate embodiments not specifically shown but which are intended to be included within the scope of this invention as defined by the following claims.

What I claim is:

1. A clarifier for removing solids from waste water in a waste water flow channel comprising,
    (a) a forward section connected to a rear section by side walls, said forward section and side walls rising above said waste water, said rear section having an opening below the waste water level to allow said waste water to enter a cavity formed by the forward section, the rear section and the side walls.
    (b) a bottom panel attached to said side walls below said waste water level, said bottom panel having rows of vertically inclined panels separated by bottom openings to allow said solids to flow from said cavity back to said channel;
    (c) an effluent launder attached to said side panels and postioned in said forward section, said launder comprising a trough having means to allow said waste water located in said cavity to enter said through; and,
    (d) hollow directional tubes connecting with said bottom openings and angularly inclined down from said bottom panel and facing opposite the waste water flow.
2. A clarifier according to claim 1 wherein parallel keels are attached to said bottom panel and positioned along the length of said bottom panel on either side of said tubes.
3. A clarifier according to claim 1 wherein the downward protruding ends of said tubes are perpendicular to said bottom panel.
4. A clarifier according to claim 1 wherein a rear baffle is positioned in said rear section and extends between said side walls and downward toward said bottom panel.
5. A clarifier according to claim 4 wherein a second baffle is positioned in said rear section and extends partially between said side walls and downward toward said bottom panel.
6. A clarifier according to claim 1 wherein at least some of said directional tubes are restricted in said forward section.
7. A clarifier according to claim 1 wherein said side walls are separated a distance less than the width of said waste water flow channel.

* * * * *

UNITED STATES PATENT AND TRADEMARK OFFICE
CERTIFICATE OF CORRECTION

PATENT NO. : 4,383,922
DATED : May 17, 1983
INVENTOR(S) : Harold J. Beard

It is certified that error appears in the above—identified patent and that said Letters Patent is hereby corrected as shown below:

In Claim 1, line 9, delete "." and substitute --;--.

Signed and Sealed this

First Day of March, 1988

*Attest:*

DONALD J. QUIGG

*Attesting Officer*  *Commissioner of Patents and Trademarks*